(12) United States Patent
Choi

(10) Patent No.: US 8,646,003 B2
(45) Date of Patent: Feb. 4, 2014

(54) METHOD AND DEVICE FOR DISPLAYING ELECTRONIC PROGRAM GUIDE

(75) Inventor: Eun Hae Choi, Gumi-si (KR)

(73) Assignee: LG Electronics Inc., Seoul (KR)

( * ) Notice: Subject to any disclaimer, the term of this patent is extended or adjusted under 35 U.S.C. 154(b) by 214 days.

(21) Appl. No.: 12/672,779

(22) PCT Filed: Aug. 13, 2008

(86) PCT No.: PCT/KR2008/004695
§ 371 (c)(1),
(2), (4) Date: Feb. 9, 2010

(87) PCT Pub. No.: WO2009/022852
PCT Pub. Date: Feb. 19, 2009

(65) Prior Publication Data
US 2011/0030011 A1   Feb. 3, 2011

(30) Foreign Application Priority Data

Aug. 13, 2007  (KR) .................... 10-2007-0081280

(51) Int. Cl.
  *G06F 3/00* (2006.01)
  *G06F 13/00* (2006.01)
  *H04N 5/445* (2011.01)
(52) U.S. Cl.
  USPC .................................. 725/45; 725/39; 725/47
(58) Field of Classification Search
  None
  See application file for complete search history.

(56) References Cited

U.S. PATENT DOCUMENTS

| 5,900,915 A * | 5/1999 | Morrison ................. 725/44 |
| 6,172,674 B1 | 1/2001 | Etheredge ............... 345/327 |
| 2002/0053084 A1 * | 5/2002 | Escobar et al. .......... 725/47 |
| 2003/0154482 A1 | 8/2003 | Tsukamoto et al. ...... 725/53 |
| 2005/0160456 A1 * | 7/2005 | Moskowitz .............. 725/45 |
| 2006/0020973 A1 * | 1/2006 | Hannum et al. ......... 725/46 |
| 2008/0244671 A1 * | 10/2008 | Moon et al. ........... 725/110 |
| 2008/0271078 A1 * | 10/2008 | Gossweiler et al. ..... 725/40 |

FOREIGN PATENT DOCUMENTS

| CN | 1269097 A | 10/2000 |
| CN | 1540976 A | 10/2004 |
| EP | 1 128 670 A2 | 8/2001 |
| EP | 1 471 735 A2 | 10/2004 |
| JP | 2003219300 A | 7/2003 |
| KR | 10-20040092464 A | 11/2004 |
| WO | WO 99/04560 A1 | 1/1999 |
| WO | WO 02/052856 A2 | 7/2002 |

OTHER PUBLICATIONS

European Search Report dated Aug. 12, 2010 issued in Application No. 08 79 3209.
PCT International Search Report dated Dec. 17, 2008.
Chinese Office Action dated Apr. 19, 2011 issued in Application No. 200880103373.4 (English translation only).

* cited by examiner

*Primary Examiner* — Oschta Montoya
(74) *Attorney, Agent, or Firm* — KED & Associates LLP

(57) ABSTRACT

A method and device for displaying a broadcasting program are disclosed. An electronic program guide (EPG) is newly generated according to user set option information and the EPG is displayed on a screen on user's request.

10 Claims, 6 Drawing Sheets

EPG

| 7.29(Friday) | 5:00pm | 5:30pm | 6:00pm | 6:30pm |
|---|---|---|---|---|
| 9 KBS1 | News N | | | |
| 7 KBS2 | | | | |
| 11 MBC | News N | | | |
| 6 SBS | News N | | | |
| 13 EBS | | | | |
| 3 ITV | | | | |

200

Option (News N ) and
(Korean language@ kor)

Fig. 1

EPG 7.29(Friday) 6:30 p.m.
6:30~7:00 p.m. KBS2 CH7
Cooking King

| 7.29(Friday) | 5:00pm | 5:30pm | | 6:00pm | | 6:30pm |
|---|---|---|---|---|---|---|
| 9 KBS1 | News | Funny... | The World is.. | It's 6 O'clock, My Hometown | | |
| 7 KBS2 | By Myself.. | Run Singsing | Little Prince | Supercop | | Cooking King |
| 11 MBC | News | Special World Greatest Masterpiece | | ...Viewed through TV | | Talk Focus |
| 6 SBS | News | TV Exploring | Get together, dream world | Zzanggu.. | | Youth |
| 13 EBS | Funny | Move.. | Aha.. | Elementary School-1st grade | Elementary School-3st grade | Elementary School-5st grade |
| 3 ITV | TV Cooking Heaven | | World Greatest Cartoon | | | Start, Park Chan-ho |

 highlight

Fig. 6

EPG

| 7.29(Friday) | 5:00pm | 5:30pm | 6:00pm | 6:30pm |
|---|---|---|---|---|
| 9 KBS1 | News [N] | | | |
| 7 KBS2 | | | | |
| 11 MBC | News [N] | | | |
| 6 SBS | News [N] | | | |
| 13 EBS | | | | |
| 3 ITV | | | | |

200

Option (News [N]) and (Korean language @ kor)

Fig. 7

EPG

| 7.29(Friday) | 5:00pm | 5:30pm | 6:00pm | 6:30pm |
|---|---|---|---|---|
| 9 KBS1 | News [N] kor | Funny kor | The World is.. kor | |
| 7 KBS2 | | Run Singing kor | | Cooking King.. kor |
| 11 MBC | News [N] kor | | | |
| 6 SBS | News [N] kor | | | Youth.. kor |
| 13 EBS | | | | |
| 3 ITV | TV Cooking Heaven kor | | | |

200   210

Option (News [N]) and (Korean language @ kor)

METHOD AND DEVICE FOR DISPLAYING ELECTRONIC PROGRAM GUIDE

TECHNICAL FIELD

The present invention relates to a device for providing a broadcasting program, and more particularly, to a method and device for generating an electronic program guide (EPG) corresponding to option information set by a user and displaying the EPG on a screen on user's request.

BACKGROUND ART

Generally, with the high level development of broadcasting and communication which have been recognized as separate fields, a demand for services by a user has gradually increased.

In a broadcasting field which has offered only a unidirectional service, a worldwide trend is to provide various information and an interactive service with users. To achieve this end, the digitalization of broadcasting has been actively pushed.

For example, broadcasting transmitted through the digital Mugungwha satellite by compressing video, audio, data, etc. by moving picture experts group (MPEG) standard allocates main bandwidths to a broadcasting program and control information and uses the other bandwidths as a side information channel for broadcasting program related information.

Accordingly, an electronic program guide (EPG) service is provided so that users may effectively obtain information broadcasted through various channels from side information.

EPG information is included in resource and subscriber management system (RSMS) data. The RSMS data is comprised of program specific information and side information.

A television (TV) decodes information contained in received side information, such as a program identification (PID), a start time, a broadcasting time, a program rating level, a video type, and a sound multiplex mode, and displays an EPG screen on a TV display.

If the EPG screen is requested to be displayed while a user watches a broadcasting program, conventional broadcasting guide information provides broadcasting guides provided by media such as paper. That is, detailed information on programs which are currently being broadcasted or programs to be broadcasted and information on programs which previously set a recording function is provided as illustrated in FIG. 1. Therefore, it is difficult to easily confirm broadcasting programs that the user prefers.

DISCLOSURE OF INVENTION

Technical Problem

An object of the present invention devised to solve the problem lies on providing an EPG displaying method and device capable of easily confirming only information on user-preferred broadcasting programs by generating an EPG according to option information set by a user and displaying the generated EPG on a screen.

Technical Solution

The object of the present invention can be achieved by providing a method for displaying an electronic program guide (EPG), comprising: storing EPG option information selected by a user; extracting side information of a broadcasting program received through a tuner, and detecting the stored EPG option information; comparing the side information of the broadcasting program with the EPG option information, generating a user set EPG including broadcasting programs corresponding to the detected EPG option information, and storing the user set EPG; and if a request for displaying the user set EPG is made by a user, displaying the user set EPG on a screen.

In another aspect of the present invention, provided herein is a device for displaying an electronic program guide (EPG), comprising: a memory for storing EPG option information selected by a user: an EPG generator for extracting side information of a broadcasting program received through a tuner, detecting the EPG option information stored in the memory comparing the side information of the broadcasting program with the EPG option information, and generating a user set EPG including broadcasting programs corresponding to the detected EPG option information; and a controller for displaying the user set EPG on a screen when a request for displaying the user set EPG is made by a user.

Advantageous Effects

The present invention can easily confirm and rapidly select only information on user-preferred broadcasting programs by providing an EPG according to option information set by a user.

Furthermore, option information according to generation of an EPG can be easily confirmed by a user by displaying the option information set by the user by icons at the interior of a grid of a corresponding program provided in the EPG.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 1 illustrates an example of an EPG displaying screen according to the prior art.

FIG. 6 is a diagram illustrating an EPG displaying screen of a TV according to an exemplary embodiment of the present invention.

FIG. 7 is a diagram illustrating an EPG displaying screen of a TV according to another exemplary embodiment of the present invention.

BEST MODE FOR CARRYING OUT THE INVENTION

Hereinafter, an EPG displaying device and method according to an exemplary embodiment of the present invention are described in detail with reference to the accompanying drawings.

Figure 2:
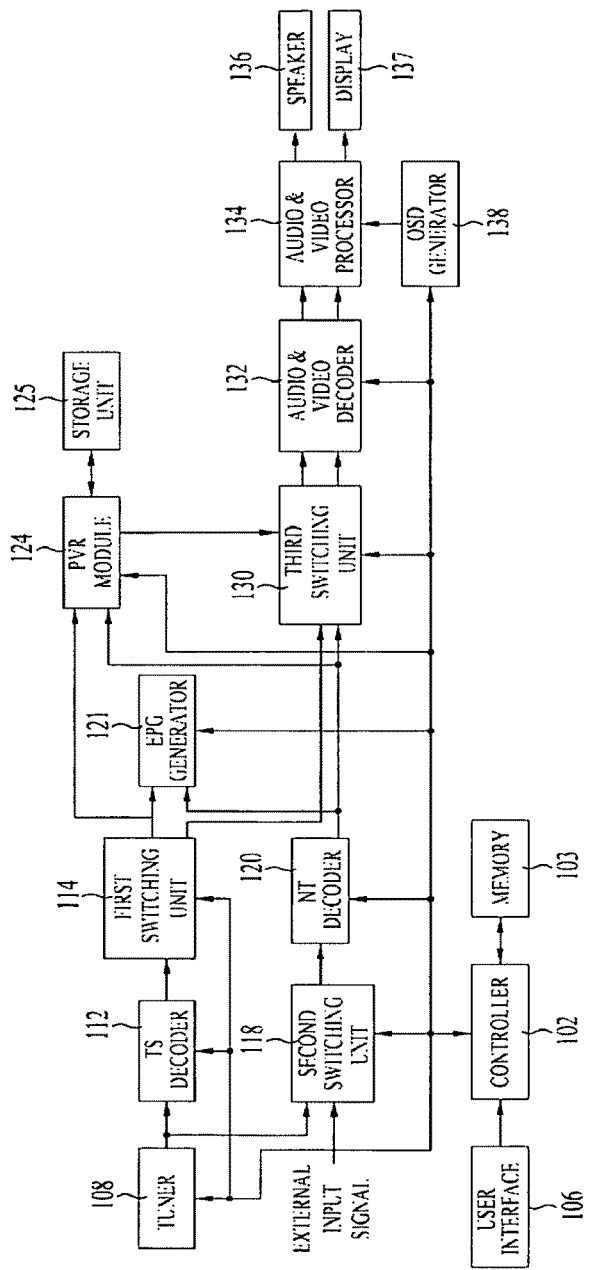
FIG. 2 is a block diagram schematically illustrating a TV configuration according to an exemplary embodiment of the present invention.

FIG. 2 is a block diagram schematically illustrating a TV configuration including an EPG displaying device according to an exemplary embodiment of the present invention.

As illustrated in FIG. 2, a TV including the EPD displaying device according to an exemplary embodiment of the present invention includes a controller 102 for controlling the TV as a whole, a memory 103 for storing EPG option information inputted by a user and an EPG according to a user setting, a tuner 108 for tuning a broadcasting channel by the control of the controller 102, a transport stream (TS) decoder 112 for processing a digital broadcasting signal, and an NTSC (NT) decoder 120 for processing an analog broadcasting signal. The TV also includes an EPG generator 121 for extracting EPG information from side information contained in the digital or analog broadcasting signal and generating a new EPG according to a user setting by using the extracted information and the EPG option information stored in the memory 103, a personal video recorder (PVR) module 124 for recording a received broadcasting program by the selection of a user or temporarily storing the received broadcasting program according to a time shift function, and an audio and video processor 134 for processing the digital or analog broadcasting signal, or broadcasting data provided by the PVR module 124 to be outputted through a speaker 136 and a display 137.

The controller 102 controls the TV as a whole. Especially, if a user requests the TV to display an EPG, the controller 102 controls the EPG generator 121 to generate user set EPG information according to EPG option information that is previously set by the user.

If the EPG corresponding to the user option information is generated, the controller 102 enables only broadcasting programs which satisfy all option information selected by the user or at least one of the option information so as to be displayed on a screen.

If an arrow key signal is inputted by the user on the EPG, the controller 102 controls a key to be shifted within the enabled broadcasting programs and to highlight a grid of a corresponding broadcasting program.

The memory 103 stores EPG option information selected by the user, stores an EPG for all received broadcasting programs, and a user set EPG newly generated according to the EPG option information inputted by the user.

A user interface 106 is a keypad provided on a TV body or a remote controller. The user interface 106 receives various commands inputted by the user or EPG option information after outputting an on-screen display (OSD) and transmits the inputted commands or information to the controller 102.

The tuner 108 tunes channels by the control of the controller 102 out of broadcasting data inputted through a sky wave or a cable. A digital broadcasting signal and an analog broadcasting signal among broadcasting signals received through the tuned channel are respectively supplied to the TS decoder 112 for processing the digital broadcasting signal and the NT decoder 120 for processing the analog broadcasting signal.

The TS decoder 112 decodes the digital broadcasting signal provided by the tuner 108, converts the decoded signal into an audio and video stream and a data stream, and transmits the converted streams to a first switching unit 114.

The first switching unit 114 transmits the audio and video stream and the data stream to the EPG generator 121 by the control of the controller 102.

The EPG generator 121 generates an EPG for all broadcasting programs by extracting side information from the data stream of the received broadcasting program and stores the EPG in the memory 103. Moreover, the EPG generator 121 detects the EPG option information stored by the user in the memory 103 and newly generates a user set EPG by extracting only broadcasting programs satisfying the detected EPG option information. The EPG 121 stores the user set EPG in the memory 103. In this case, the EPG 121 may generate the user set EPG including broadcasting programs which satisfy all or at least one of the EPG option information selected by the user.

Figure 3:
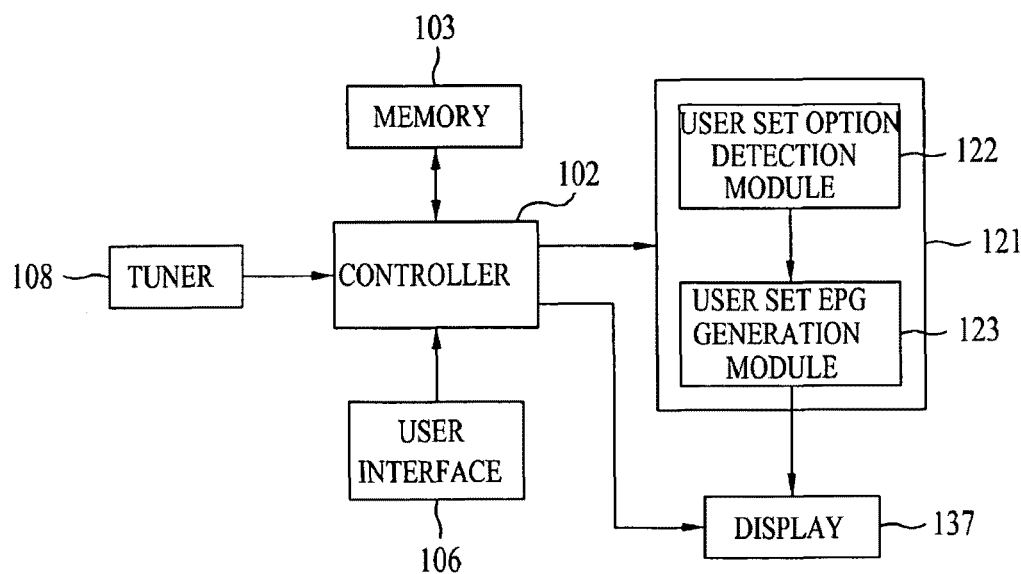
FIG. 3 is a block diagram of an EPG displaying device according to an exemplary embodiment of the present invention.

FIG. 3 is a detailed block diagram of an EPG displaying device according to an exemplary embodiment of the present invention. A module constituting the EPG generator 121 is shown in more detail.

Referring to FIG. 3, the EPG generator 121 includes a user set option detection module 122 for detecting the EPG option information selected by the user from the memory 103, and a user set EPG generation module 123 for comparing the EPG option information detected by the user set option detection module 122 with side information included in a received broadcasting signal and newly generating a user set EPG by extracting only broadcasting programs satisfying the EPG option information.

The newly generated EPG information according to the user option information may be stored in the memory 103 separately from the EPG providing general broadcasting program information.

A second switching unit 118 receives the analog broadcasting signal provided by the tuner 108 and an external input signal and selectively transmits any one of the two signals to the NT decoder 120 by the control of the controller 102.

The NT decoder 120 for processing the analog broadcasting signal receives the analog broadcasting signal or the external input signal by the second switching unit 118, decodes the analog broadcasting signal or the external input signal to audio and video data, and transmits an audio and video stream and a data stream to the EPG generator 121 by the control of the controller 102.

The PVR module 124 receives the audio and video stream and the data stream of the digital broadcasting signal by the control of the controller 102 and stores them in a storage unit 125. The PVR module 124 also MPEG encodes audio and video data of the analog broadcasting signal to the audio and video stream and stores the encoded stream in the storage unit 125.

A third switching unit 130 selects at least one of the broadcasting program received according to the control of the controller 102 and the broadcasting program stored in the PVR module 124 and transmits the selected program to an audio and video decoder 132.

The audio and video decoder 132 decodes the audio and video stream to video and audio data and provides the audio and video data to the audio and video processor 134, when the audio and video stream is provided thereto. If the audio and video data is provided to the audio and video decoder 132, the audio and video decoder 132 provides the audio and video data to the audio and video processor 134.

The audio and video processor 134 processes at least one of the audio and video data provided by the audio and video decoder 132 and outputs the processed audio data and video data to the speaker 136 and the display 137, respectively. The audio and video processor 134 mixes OSD data provided by the controller 102 with the video data and transmits the mixed data to the display 137.

The display 137 enables or highlights broadcasting programs satisfying the EPG option information selected by the user and outputs the user set EPG.

The display 137 may display the EPG option information selected by the user by icons at the interior of a grid of a broadcasting program corresponding to the EPG option information.

The user set EPG may be achieved as a type listing broadcasting programs or a type classifying the broadcasting programs according to the EPG option information selected by the user.

An EPG displaying method applicable to the above-described TV will now be described with reference to FIGS. 4 to 7.

Figure 4:
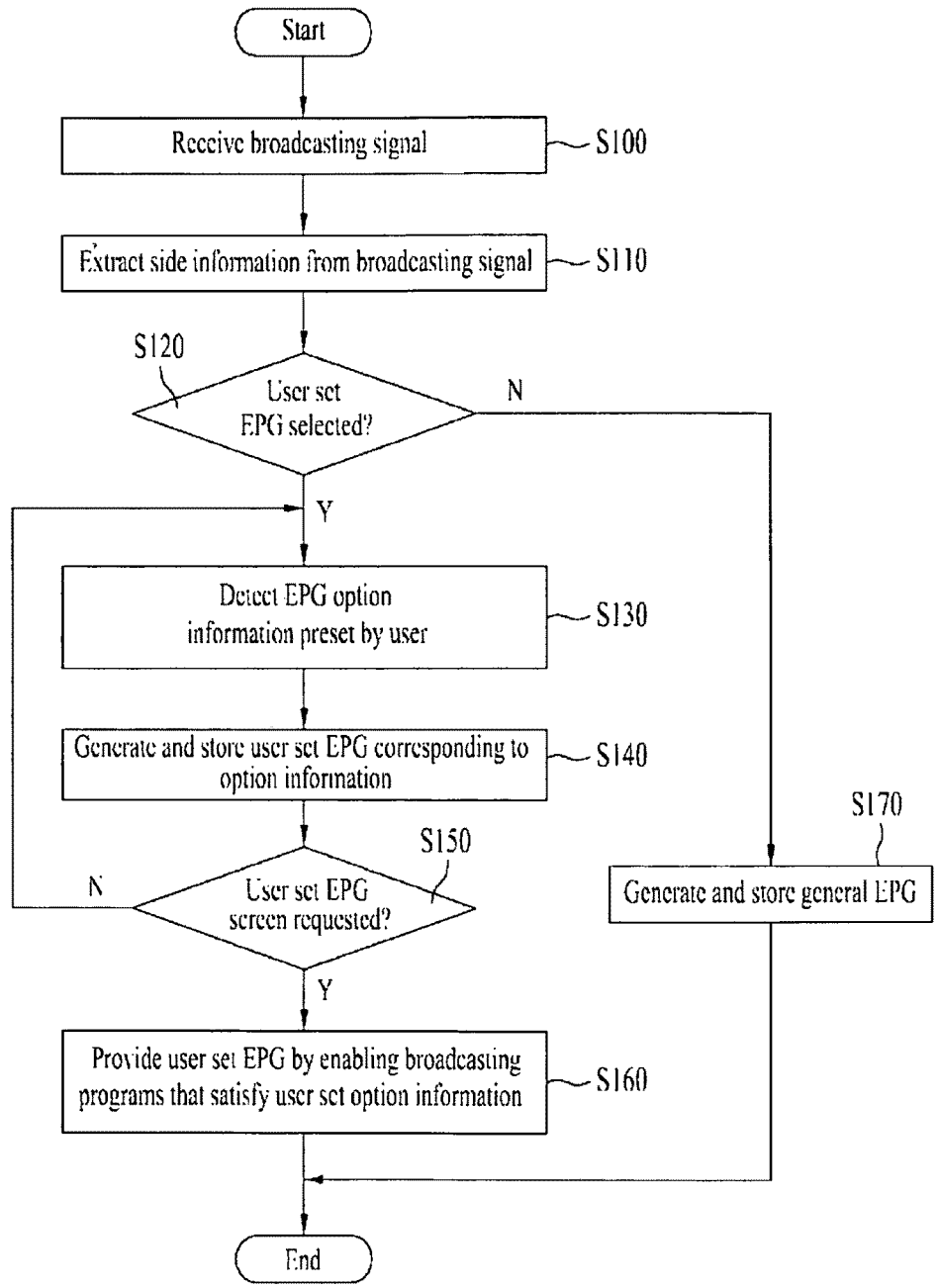
FIG. 4 is a flow chart illustrating an EPG setting method of a TV according to an exemplary embodiment of the present invention.

FIG. 4 is a flow chart illustrating an EPG setting method of a TV according to an exemplary embodiment of the present invention.

In the EPG setting method illustrated in FIG. 4, the EPG option information selected by the user through the user interface 106 is inputted and stored in the memory 103.

Thereafter, a broadcasting signal is received through the tuner 108 (S100) and side information contained in the received broadcasting signal is extracted (S110).

While an EPG is generated using the extracted side information, it is checked whether a user set EPG is selected (S120). If the user set EPG is not selected, the controller 102 generates a general EPG providing EPG information on all broadcasting programs and stores the general EPG in the memory 103 (S170).

If the user set EPG is selected, the controller 102 controls the EPG generator 121 to detect the EPG option information stored in the memory 103 (S130).

The EPG generator 121 compares the EPG option information detected by the memory 103 with the side information of the received broadcasting signal, generates a user set EPG including broadcasting programs satisfying the EPG option information, and stores the user set EPG in the memory 103 (S140).

That is, the EPG generator 121 detects broadcasting programs satisfying the EPG option information selected by the user and constructs an EPG only with the detected broadcasting programs.

If a display request signal of the EPG generated according to the EPG option information is inputted by the user (S150), the controller 102 displays EPG information generated according to the user set option information on a screen (S160).

In this case, the EPG information displayed on the screen enables only broadcasting programs satisfying the EPG option information under the control of the controller 102. Therefore, when a broadcasting program is selected, a key is shifted only within the enabled broadcasting programs.

A process of displaying the EPG generated according to a user option setting will now be described with reference to FIG. 5.

Figure 5:
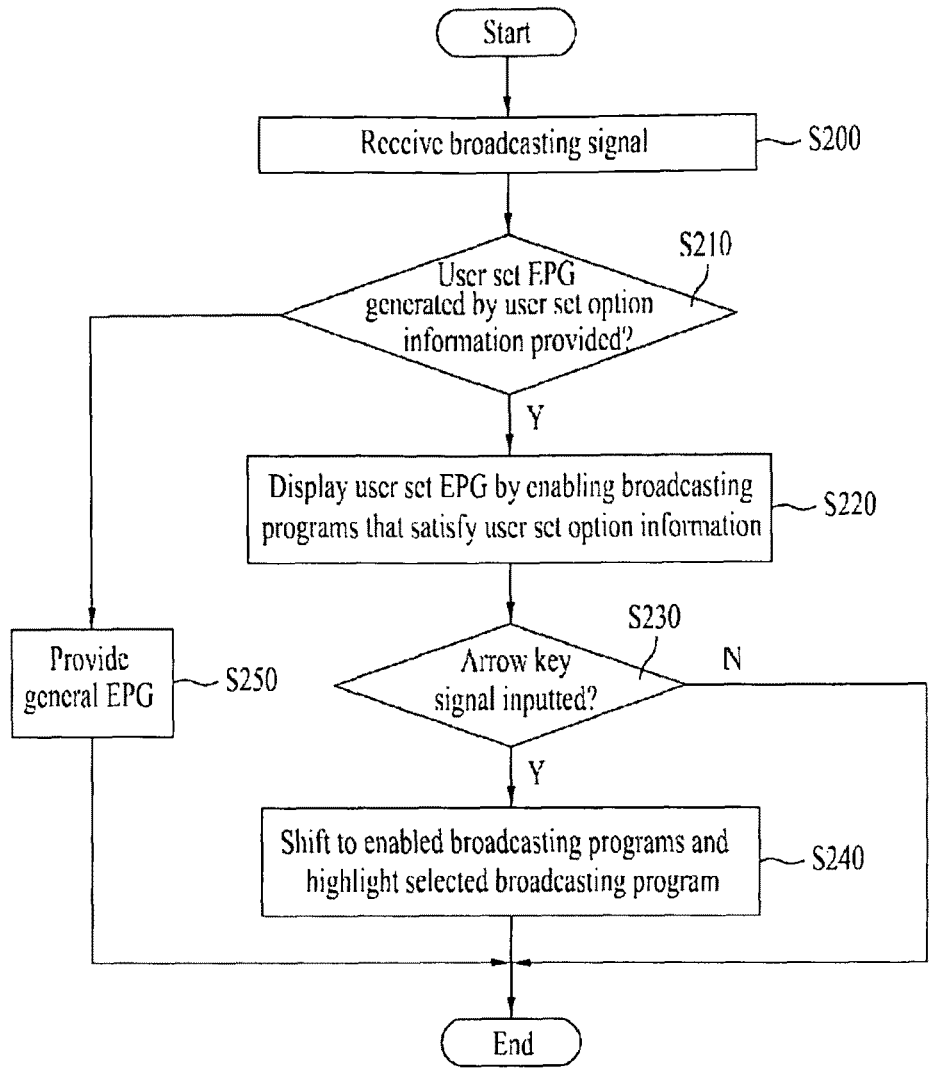
FIG. 5 is a flow chart illustrating an EPG displaying method TV according to an exemplary embodiment of the present invention.

FIG. 5 is a flow chart illustrating an EPG displaying method of a TV according to an exemplary embodiment of the present invention.

Referring to FIG. 5, if an EPG request signal is inputted by the user (S200), the controller 102 determines whether the EPG request signal is an EPG screen display request signal corresponding to the user EPG option information or a general EPG request signal for all broadcasting programs (S210). If the EPG request signal is a general EPG request signal, broadcasting information on all the broadcasting programs is provided (S250).

Meanwhile, if the EPG request signal is generated by the user set option information, the controller 102 displays the user set EPG enabling the broadcasting programs satisfying the user set option information (S220).

In this case, the user set EPG generated according to the user option information displays only the broadcasting programs satisfying the option information out of information on all the broadcasting programs in a highlighted way, or provides only the broadcasting programs satisfying the option information without providing information on the other broadcasting programs.

If an arrow key for selecting a broadcasting program on the user set EPG is inputted by the user (S230), the controller 102 shifts a key within the enabled broadcasting programs and highlights a grid of a selected broadcasting program (S240).

The EPG screen displaying only the broadcasting programs satisfying the user option information will now be described with reference to FIGS. 6 and 7.

FIG. 6 is a diagram illustrating an EPG displaying screen of a TV according to an exemplary embodiment of the present invention.

Referring to FIG. 6, a user set EPG is configured for broadcasting programs satisfying all EPG option information inputted by the user, and user set EPG option information is a genre and an audio setting.

Namely, if an option which is set to configure the EPG by the user is broadcasting programs of which genre is news and of which audio is the Korean language, corresponding broadcasting programs satisfying the above option information are enabled and displayed on an EPG.

The user set EPG illustrated in FIG. 6 is configured by detecting broadcasting programs satisfying both the genre and the audio setting and corresponding broadcasting programs, that is 3 news programs are enabled. If a selection key signal of a broadcasting program is inputted by the user, selection is made within 3 news programs broadcasted through different channels at 5 o clock p.m.

Meanwhile, FIG. 7 is a diagram illustrating an EPG displaying screen of a TV according to another exemplary embodiment of the present invention.

Referring to FIG. 7, an EPG is configured for broadcasting programs satisfying at least one of EPG option information inputted by the user, and user set EPG option information is a genre and an audio setting.

Therefore, if a genre of a broadcasting program is news or a broadcasting program is provided in the Korean language, since the user set option information is satisfied, the controller enables corresponding broadcasting programs to be displayed on the user set EPG.

The EPG shown in FIG. 7 is configured by detecting broadcasting programs satisfying option information, that is, either broadcasting programs of which genre is news or broadcasting programs provided in the Korean language.

Therefore, 3 news programs satisfying a genre option and 6 programs satisfying an audio option are enabled to provide the EPG.

If a selection key signal of a broadcasting program is inputted by the user, a key is shifted to any one of 9 broadcasting programs and only a grid of a corresponding broadcasting program is highlighted.

The EPG generated according to a user setting not only provides information on broadcasting programs but displays option information icons 200 and 210 for informing the user of the user set option information at the interior of a grid of a corresponding broadcasting program. Therefore, the user can confirm the user set option information.

The user set EPG may include a list type listing broadcasting programs corresponding to the user set option information. Alternatively, the user set EPG may include a type classifying broadcasting programs according to a channel number, time, a program name, a user rating level, etc.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

MODE FOR THE INVENTION

Various embodiments have been described in the best mode for carrying out the invention.

INDUSTRIAL APPLICABILITY

According to the present invention, information on user-preferred broadcasting programs can be rapidly confirmed and desired broadcasting programs can be easily selected, by extracting broadcasting programs satisfying user option information and by enabling only the extracted broadcasting programs.

The invention claimed is:

1. A method for displaying an electronic program guide (EPG), comprising:
  storing EPG option information selected by a user, the EPG option information including preset information designated by a user and stored in a memory to cause a first EPG to display a first type of program information without displaying a second type of program information;
  receiving side information of a received broadcasting program;
  determining if the preset information is stored in the memory;
  selecting the broadcasting program according to the preset information stored in the memory;
  generating the first EPG including only the selected broadcasting program and not including the others from all broadcasting programs received, the first EPG including information identifying broadcasting programs corresponding to the first type of program information and not including information identifying broadcasting programs corresponding to the second type of program information;
  when an EPG display request is received, automatically displaying the first EPG on a screen based on the preset information stored in the memory, wherein the first EPG includes:
  one or more first grids that provide one or more broadcasting programs satisfying the EPG option information, and
  one or more second grids that omit broadcasting programs which do not satisfy the EPG option information, wherein one or more broadcasting programs of the one or more first grids satisfy all the EPG option information selected by the user,
  wherein all the EPG option information selected by the user is displayed by an icon in the one or more first grids, and the icon corresponding to the EPG option information is displayed in all of the one or more first grids,
  wherein if a key for selecting the broadcasting programs on the first EPG is input by the user, the key is shifted to any one of the broadcasting programs provided in the first EPG and only the first grid of a selected broadcasting program is highlighted,
  wherein the first grid displays at least one of icon corresponding the EPG option information,
  wherein a number of the icons displayed in each first grid is equal to a number of the EPG option information selected by the user, and
  wherein the number of the icons displayed in each first grid is the same.

2. The method according to claim 1, wherein the stored EPG option information includes at least one of a genre, rating level, language, or channel of the broadcasting program.

3. The method according to claim 1, further comprising outputting a user interface configured to receive the EPG option information from the user.

4. The method according to claim 1, wherein the first type of program information corresponds to programs in first language corresponding to the preset information designated by the user.

5. The method according to claim 4, wherein the one or more second grids include empty spaces.

6. A device for displaying an electronic program guide (EPG), comprising:
  a memory configured to store EPG option information selected by a user, the EPG option information including preset information designated by a user to cause a first EPG to display a first type of program information without displaying a second type of program information;
  a receiver configured to receive side information of a broadcasting program;
  an EPG generator configured to detect the stored EPG option information, select the broadcasting program according to the preset information stored in the memory, and generate the first EPG including only the selected broadcasting program and not including the others from all broadcasting programs received, wherein the first EPG includes information identifying broadcasting programs corresponding to the first type of program information and not including information identifying broadcasting programs corresponding to the second type of program information; and
  a controller configured to control displaying the first EPG on a screen automatically when an EPG display request signal is received, wherein the first EPG includes:
  one or more first grids that provide one or more broadcasting programs satisfying the EPG option information, and
  one or more second grids that omit broadcasting programs which do not satisfy the EPG option information, wherein the one or more broadcasting programs of the one or more first grids satisfy all of the EPG option information selected by the user,
  wherein all the EPG option information selected by the user is displayed by an icon in the one or more first grids, and the icon corresponding to the EPG option information is displayed in all of the one or more first grids,
  wherein if a key for selecting the broadcasting programs on the first EPG is input by the user, the controller shifts the key to any one of the broadcasting programs provided in the first EPG and highlights only the first grid of a selected broadcasting program,
  wherein the first grid displays at least one of icon corresponding the EPG option information,
  wherein a number of the icons displayed in each first grid is equal to a number of the EPG option information selected by the user, and
  wherein the number of the icons displayed in each first grid is the same.

7. The device according to claim 6, wherein the stored EPG option information includes at least one of a genre, rating level, language, or channel of the broadcasting program.

8. The device according to claim 6, further comprising a user interface configured to receive the EPG option information from the user.

9. A method for displaying an electronic program guide (EPG), comprising:
- receiving EPG option information;
- storing the received EPG option information;
- extracting side information of a broadcasting program received;
- detecting the stored EPG option information;
- comparing the side information of the broadcasting program with the EPG option information;
- generating an EPG including broadcasting programs corresponding to the detected EPG option information; and
- displaying the generated EPG on a screen,
- wherein the displayed EPG includes a plurality of first girds and a plurality of second grids,
- the plurality of first grids display the broadcasting programs satisfying the EPG option information and icons corresponding the EPG option information,
- the plurality of second grids include empty spaces without displaying the broadcasting programs satisfying the EPG option information and the icons corresponding the EPG option information,
- the number of the icon on the first grid is equal to the number of the EPG option information, and
- the number of the icon is the same in all first grids.

10. A device for displaying an electronic program guide (EPG), comprising:
- a user interface for receiving EPG option information:
- a memory for storing the received EPG option information;
- an EPG generator for extracting side information of a broadcasting program received through a tuner, detecting the EPG option information stored in the memory, comparing the side information of the broadcasting program with the EPG option information, and generating an EPG including broadcasting programs corresponding to the detected EPG option information; and
- a controller for displaying the generated EPG on a screen when a request for displaying the EPG is made by a user,
- wherein the displayed EPG includes a plurality of first grids and a plurality of second grids,
- the plurality of first grids display the broadcasting programs satisfying the EPG option information and icons corresponding the EPG option information,
- the plurality of second grids include empty spaces without displaying the broadcasting programs satisfying the EPG option information and the icons corresponding the EPG option information,
- the number of the icon on the first grid is equal to the number of the EPG option information, and
- the number of the icon is the same in all first grids.

* * * * *